United States Patent

[11] 3,614,167

| [72] | Inventor | William C. Patterson |
| | | Canso, Nova Scotia, Canada |
| [21] | Appl. No. | 861,890 |
| [22] | Filed | Sept. 29, 1969 |
| [45] | Patented | Oct. 19, 1971 |
| [73] | Assignee | Atlantic Bridge Company Limited |
| | | Lunenburg, Nova Scotia, Canada |
| [32] | Priority | Oct. 8, 1968 |
| [33] | | Canada |
| [31] | | 031,923 |

[54] APPARATUS FOR CONVEYING AND HANDLING ARTICLES
18 Claims, 13 Drawing Figs.

[52] U.S. Cl. ................................................... 302/14
[51] Int. Cl. ..................................................... B65g 53/30
[50] Field of Search ......................................... 302/14, 15, 16, 24

[56] References Cited
UNITED STATES PATENTS

| 3,226,164 | 12/1965 | Merrick ........................ | 302/14 |
| 3,254,924 | 6/1966 | Harrison et al. ............... | 302/14 |
| 3,287,068 | 11/1966 | Kimmerle ..................... | 302/14 |

FOREIGN PATENTS

| 1,807,620 | 6/1969 | Germany ..................... | 302/14 |

Primary Examiner—Andres H. Nielsen
Attorney—Cushman, Darby & Cushman

ABSTRACT: An apparatus for conveying and handling somewhat delicate objects, such as fish, which includes an elongated generally horizontally disposed chamber the interior of which is connected to the intake of a suction fan. An elongated intake pipe is connected to one end of the elongated chamber and an exit chute is connected to the opposite end of the chamber. The exit chute includes a water trap therein to permit passage of articles therethrough while preventing entry of air into the chamber. The subatmospheric pressure created within the chamber by the suction fan arrangement causes air to flow rapidly through the intake pipe to carry the articles therethrough into the interior of the chamber where they are decelerated prior to passing into the exit chute. The device is provided to flow a stream of water longitudinally of the chamber from the end connected to the intake pipe to the other end which is connected to the exit chute thereby to assist in decelerating the articles while assisting in preventing damage thereto.

PATENTED OCT 19 1971 3,614,167

INVENTOR
WILLIAM C. PATTERSON

BY Cushman, Darby & Cushman
ATTORNEYS

APPARATUS FOR CONVEYING AND HANDLING ARTICLES

This invention relates in general to the handling of articles and, in particular to improvements relating to the conveying and handling of somewhat delicate objects, such as fresh sea products by means of airflow.

The handling of certain sea products, particularly the softer fleshed fish, presents problems not found in the conveyance of other, relatively tough, sea products, such as shellfish, in that such softer fleshed fish are quite easily damaged by rough handling to the point where a large proportion can be used only for a low-grade fillet pack or byproducts, such as fish meal or fish oil. Obviously, it is desirable to keep the number of damaged fish to a minimum from the profit point of view.

The unloading of fish from the holds of ships rapidly, with a minimum of effort, and with little damage to the fish presents a problem which to date has not been solved in an entirely satisfactory manner. While certain pneumatic devices have met with a limited amount of success insofar as speed and effort are concerned, it has been found that such devices, in general, cause far too much damage to the fish to be considered successful from the point of view of economy.

One prior art device which has attracted a certain amount of attention in the fishing industry is illustrated in Canadian Pat. No. 756,474 issued Apr. 11, 1967. This device is capable of withdrawing sea products, particularly shrimp, from the hold of a ship by passing the shrimp through an elongated hose and into a chamber within which is maintained a partial vacuum. The lower portion of the chamber enters into a reservoir containing water. After the shrimp enter the chamber at high velocity, they strike the surface of the water in the reservoir at substantially a right angle thereto whereby they are very quickly decelerated to almost zero velocity. The shrimp then settle below the surface of the water and come to rest upon a conveyor belt which is arranged to carry the shrimp outwardly of the reservoir and to deposit same at a convenient point e.g. on an unloading dock. Attempts have been made to use the above described device in the unloading of fish from the holds of ships. The device has been successful in conveying certain of the firmer fleshed varieties of fish, such as redfish, but has not been widely accepted in the industry due to the fact that it causes undue damage to most kinds of softer fleshed fish with damage rates often running in the order of 50 percent (i.e. damage is often caused approximately 50 percent of the catch.) A large portion of the damage appears to occur at the moment of impact of the fish with the surface of the water in the reservoir mentioned above. The damage is apparently caused by the fish striking the water at right angles at a very high velocity, which apparently results in bruising, breaking or tearing of the flesh of these fish. The problem is worsened by the presence of ice on the surface of the water in the reservoir. This ice arrives on the surface of the water along with the fish since the latter are commonly packed in ice in the hold of the vessel for storage purposes. The ice tends to choke the surface of the water thus decreasing greatly the effectiveness of the latter insofar as its use as a gradual decelerator of the fish is concerned.

The general object of the present invention is to provide devices and methods for conveying and handling articles particularly fish, shrimp and the like, in a rapid and economical manner by means of airflow, wherein provision is made to effect a substantial reduction in the amount of damage done to the more delicate articles e.g. the softer fleshed fish, as compared with the known own prior art devices. While the invention relates particularly to the handling of sea products such as fish, shrimp and the like it is also contemplated that the invention would be useful in the handling of certain other semidelicate products as well e.g. vegetables and some fruit products.

The present invention therefore relates to apparatus and methods of handling articles, particularly fish, shrimp and the like, wherein provision is made for the conveyance of the article through an elongated passageway by the use of an airstream within the latter, with means being provided to separate the article from the airstream after same has travelled through said passageway.

In the apparatus disclosed in copending application Ser. No. 724,152 filed Apr. 25, 1968 now Pat. No. 3,506,246 by D. Andrew Eisenhauer, provision is made to direct such separated articles along a path at least a portion of which is angularly inclined to the surface of a liquid bath whereby the articles meet the surface of the latter at a shallow angle. By arranging to have the article meet the surface of the bath at a shallow angle the shock of impact of such article is substantially lessened and in the case of fish, bruising and/or tearing of flesh thereof upon impact with the liquid surface is substantially reduced and in many cases almost eliminated. The apparatus disclosed in the above mentioned copending application also includes other means to effect deceleration of the articles prior to impact thereof with the liquid of the bath thereby to further lessen the possibility of damage to the articles. Such means include a cyclone chamber which receives the articles after they have passed through the elongated passageway with the result being that the articles spiral slowly downwardly within the chamber under the influence of gravitational forces thereby effecting a gradual velocity decrease therein. Such apparatus also included a downwardly inclined wall portion adapted to receive the downwardly spiralling articles with such downwardly inclined wall portion acting to guide the articles into the liquid bath at the shallow angle referred to previously. Frictional forces between the article with the inclined wall portion also effect further deceleration of the articles prior to impact thereof with the liquid bath. The structure disclosed in the said copending application also preferably includes means providing a stream of liquid into which the articles are entered as they travel within or towards the liquid bath. It was found that the stream of liquid assisted in moving the articles through the bath as well as decelerating same. The structure disclosed in the said copending application includes many other features in addition to those referred to above; however, the above resume should suffice for purposes of this specification.

Apparatus according to the present invention, besides employing a number of desirable features of the structure disclosed in the above copending application, employs a number of new features which act to simplify the device while at the same time retaining, and in some cases enhancing, the desirable features of the structure disclosed in the copending application.

One embodiment of the present invention includes an elongated chamber one end of which is provided with inlet passageway means adapted to be connected to an elongated conduit thereby to receive articles from a storage point, e.g. fish from the hold of a ship. The opposing end of the elongated chamber is provided with exit means, such exit means having associated therewith further means for containing a liquid bath with the latter means being arranged to receive the articles and to pass same therethrough while preventing ingress of air into said elongated chamber. The chamber is also provided with means for connecting the interior of same to a source of subatmospheric pressure such as a suction fan arrangement. By providing a partial vacuum within the chamber, air is caused to rush through the elongated conduit hence carrying articles from the storage region through the conduit and through the inlet means at one end of the chamber. The chamber is also provided with means for flowing a stream of liquid along the chamber floor from its one end adjacent the inlet means to its opposing end. The liquid stream assists in decelerating the rapidly moving articles entering the chamber The stream of liquid also provides a cushion which absorbs the shock of impact of the moving article as it enters into the chamber and is decelerating prior to its entry into the abovementioned liquid bath.

The inlet passageway means is arranged to direct the moving articles lengthwise of the elongated chamber. Such inlet means are also preferably arranged such that the article enters the chamber at an elevation as short a distance as possible above the floor of the chamber thus enabling the travelling articles to pass into the moving stream of liquid on the chamber floor at a very shallow angle with respect to the latter thus decreasing the shock of impact of the article with the liquid.

The means for containing the liquid bath preferably includes a portion arranged such that the articles passing thereinto from the chamber meet the surface of the liquid bath at a relatively shallow angle thus decreasing the shock of impact of such article with the bath even further. The liquid bath containing means, as mentioned above, is also arranged to prevent entry of air into the elongated chamber. In the preferred embodiment to be described, the bath containing means includes a chute having a portion thereof of such configuration as to permit the liquid bath to be contained in a lower portion thereof. The upper end of the chute is connected to the exit means of the elongated chamber while the other end of the chute opens into a flume or other suitable means whereby the fish and the water may be carried away from the apparatus. The preferred embodiment also includes means which permit the level of the liquid of the bath contained within the exit chute arrangement to be adjusted. The constant flow of liquid through the chamber and into the liquid bath causes a constant flow of liquid to pass through the exit chute while at the same time the articles, e.g. fish are carried therewith and into the exit flume arrangement.

A preferred embodiment of the invention will now be described with reference being had to the accompanying drawings in which.

Figure 1:
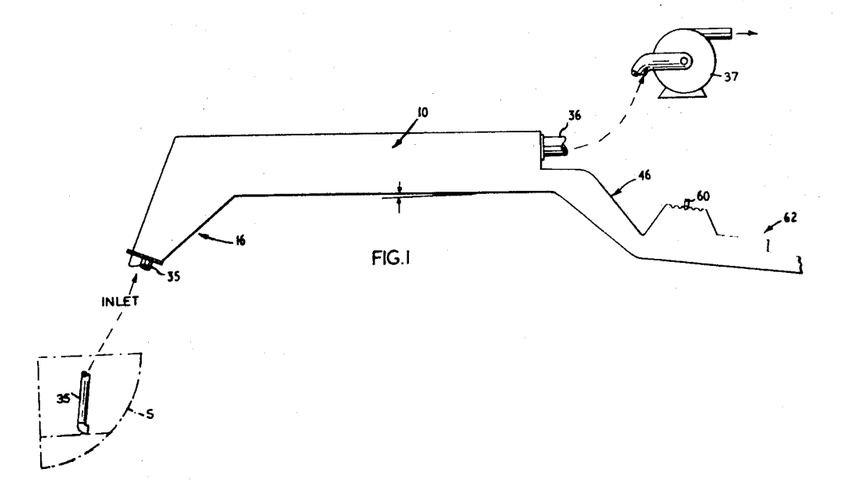
FIG. 1 is an overall, side elevational view of the apparatus of the present invention.
Figure 1A:
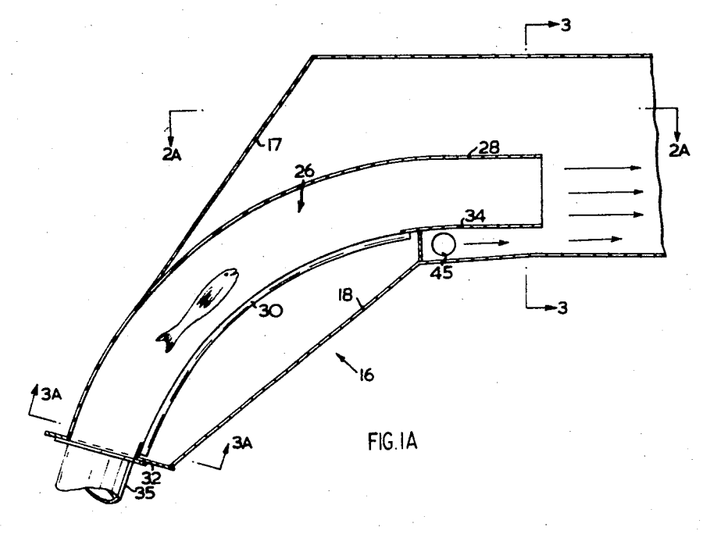
FIGS. 1A, 1B and 1C are the three parts of a sectional side elevation view of the apparatus which shows in detail the structure of the apparatus.
Figure 1B:
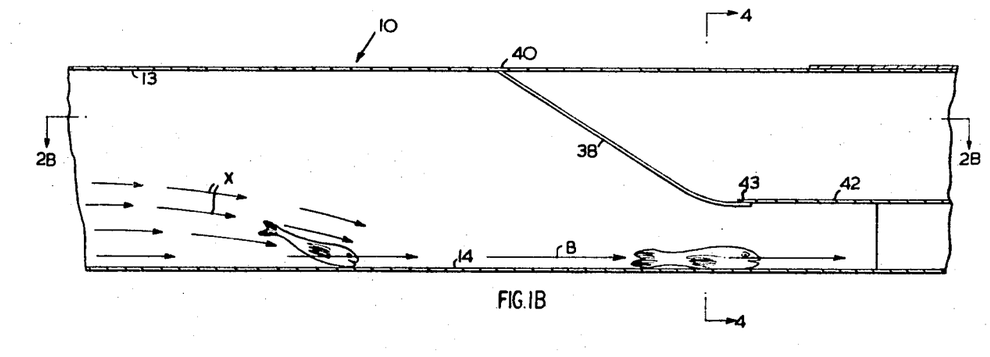

The drawings show an enclosed, generally horizontally disposed, elongated chamber 10 of generally rectangular cross section having spaced sidewalls 12, a top wall 13 and a floor 14 and supported in said generally horizontal position by suitable supporting framework (not shown). In FIG. 1A, there is seen a generally downwardly extending entrance portion 16 the sidewalls of which are defined by extended portions 12a of sidewalls 12 and the upper and lower walls of which are defined by sloping wall members 17 and 18 respectively. The opposite end of chamber 10 is closed by closure plate 20 the latter having an exit aperture 22 in the lower portion thereof whereby articles moving along floor 14 may pass outwardly of the chamber 10. An exhaust aperture 24 is also provided in closure plate 20 and is located above the exit aperture 22.

The floor 14 of chamber 10 preferably slopes downwardly from the entrance portion of the exit opening 22 by a small amount, e.g. about 5° to the horizontal, to assist in the movement of articles towards such exit opening.

Disposed within the entrance portion 16 is an upwardly extending entrance chute 26. Chute 26 has an upper wall defined by curved elongated plate 28, with one sidewall defined by the previously mentioned sidewall extension 12a and the opposite sidewall defined by curved sideplate 29. The lower wall of chute 26 is defined in part by a plurality of spaced rods 30 all curved in elevation and extending upwardly from a closure plate 32 to a further generally horizontally disposed plate 34, the latter being disposed a short distance above floor 14 of chamber 10. It will be seen from the above and from the drawings that the upper end of chute 26 is arranged so that it is substantially parallel to the floor 14 of the chamber 10 whereby articles passing therethrough are directed into chamber 10 along a path designated by arrows X which, by virtue of gravitational forces acting on the fish as well as the entrance velocity of the fish, is inclined to the floor 14 of chamber 10 by a very shallow angle.

Chamber 10 should be of a length sufficient as to permit the lightest articles passing into chamber 10 through entrance chute 26 to settle by gravity and come into contact with the floor 14 well in advance of the exit end of the chamber 10. In the particular embodiment shown the distance from the upper end of entrance chute 26 to end closure 20 was roughly 15 feet; however this figure is subject to considerable variation depending for example on the inlet velocity and direction of the articles and the height of the upper end of chute 26 above floor 14. When handling relatively large fish, it has been noted that a large percentage of the fish are not airborne at the upper end of the entrance chute 26. Hence, these fish merely slide over the floor of the entrance chute prior to being received on the floor of the chamber. Hence, the type of fish being handled is a factor to also be taken into consideration here.

The lower end of intake chute 26 is connected to an intake conduit 35, the latter being of sufficient length as to extend into, for example, the hold of a ship S from which fish are to be unloaded. In order that the intake conduit 35 may be readily moved by operating personnel, conduit 35 may be made flexible or alternatively it may be made in telescoping fashion so as to accommodate for different sizes and widths of ships, varying depths of fish in the hold and to accommodate for the rise and fall of the ship and roll of the ship while the latter is at the dockside.

The previously mentioned exhaust aperture 24 communicates with a duct 36, the latter being connected to the inlet of a suitable air exhaust device 37, the latter located in any desired position in the vicinity of the unloading and conveying apparatus. The air exhaust device will have sufficient capacity as to produce a subatmospheric pressure in chamber 10 and hence an air flow in conduit 35 of magnitude or velocity sufficient to carry the article being handled, in this case fish, upwardly through conduit 35 and chute 26 into the interior of chamber 10.

In order to prevent the articles from being handled from entering into the exhaust duct 36 a baffle comprising a plurality of inclined, spaced, parallel rods 38 are provided, the upper ends of rods 38 being connected along line 40 to top wall 13 and the lower ends being connected to one end of horizontal plate 42 at 43. Plate 42 has its opposite end connected to end closure plate 20 adjacent the upper edge of exit opening 22. A guide plate 44 is also provided adjacent exit opening 22 to deflect moving articles through the latter.

Positioned in chamber 10 just below the upper end portion of inlet chute 26 is a water inlet 45 which is connected to a pressurized water supply (not shown) which provides for a flow of a stream of water into chamber 10 and along the floor 14 thereof in the direction of arrows B. From arrows B it will be seen that the flow of water is directed longitudinally of chamber 10 in the general direction of exit opening 22 thus creating a stream of water which cushions the floor 14 of chamber 10 thus preventing damage to the articles which enter the chamber while at the same time said stream serves to gently decelerate the articles entering the chamber and assists in carrying them outwardly thereof through exit opening 22.

Attached to end closure plate 20 in such a manner as to receive articles passing through exit opening 22 is an exit chute broadly designated as 46. Exit chute 46 includes a fully enclosed downwardly depending chute portion 48, the latter including a bottom wall 50 inclined to the horizontal by a suitable amount, in this case about 40°, an upper wall 51 and spaced vertical sidewalls 52. The bottom wall 50, merges into a further wall portion 53 preferably having a shallow downward inclination, e.g. about 4°, while the upper wall 51 gradually changes direction after reaching a low point at 51a and swings upwardly to form wall portion 54, the latter terminating at 55. The spaced sidewalls 52 are, of course, shaped so as to match the configuration of wall portions referred to above.

Figure 1C:
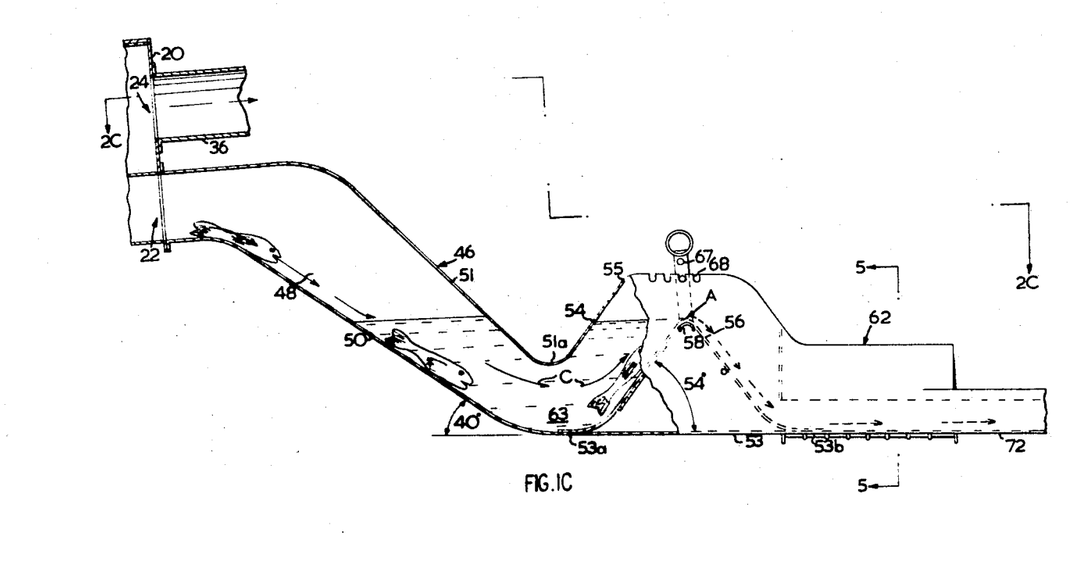
Figure 2A:
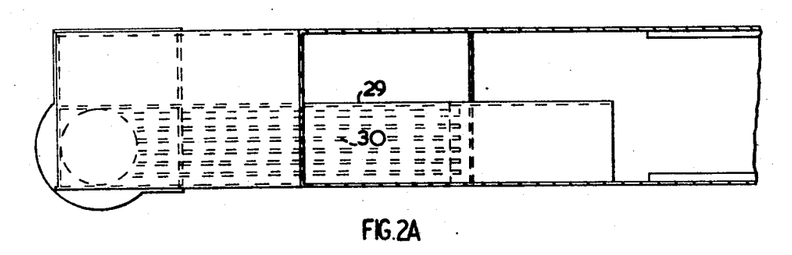
FIGS. 2A, 2B and 2C are the three parts of a plan view of the apparatus, partially in section as taken along section lines 2A—2A of FIG. 1A, 2B—2B of FIG. 1B and 2C—2C of FIG. 1C respectively and looking in the direction of the arrows.
Figure 2B:
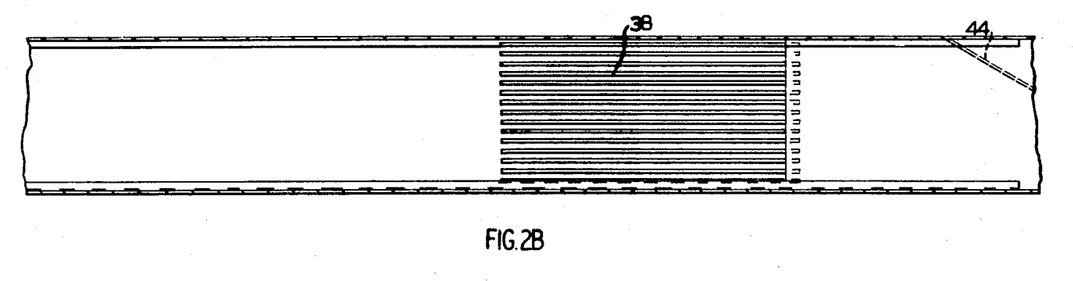
Figure 2C:
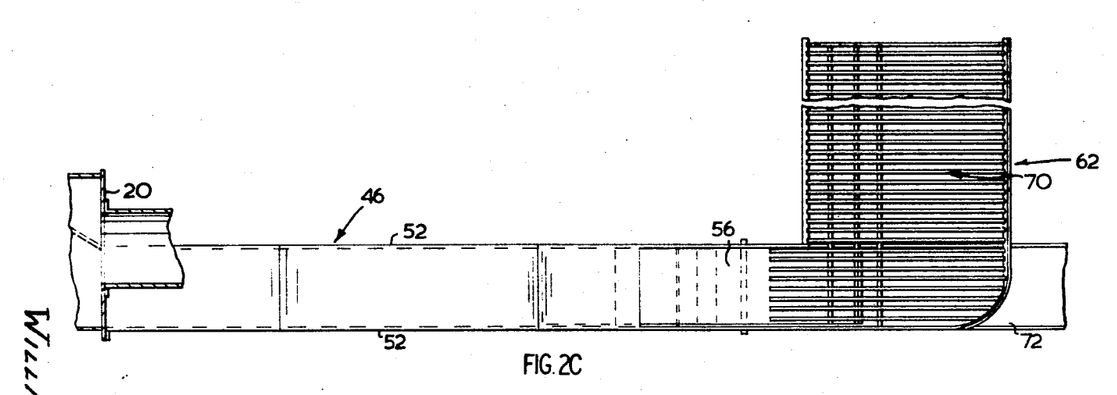
Figure 3:
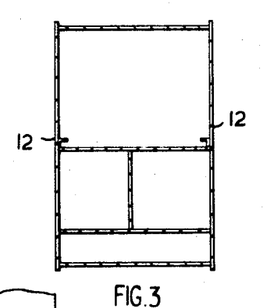
FIG. 3 is a cross-sectional view of the apparatus taken along secton line 3—3 in FIG. 1A and looking in the direction of the arrows.
Figure 3A:
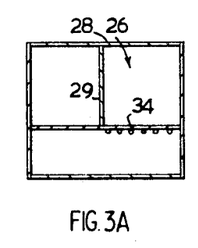
FIG. 3A is a cross section view taken along line 3A—3A in FIG. 1A looking in the direction of the arrows.
Figure 4:
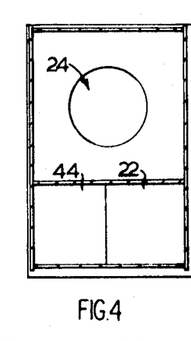
FIG. 4 is a cross-sectional view of the apparatus taken along section line 4—4 of FIG. 1B and looking in the direction of the arrows.
Figures 5, 6:
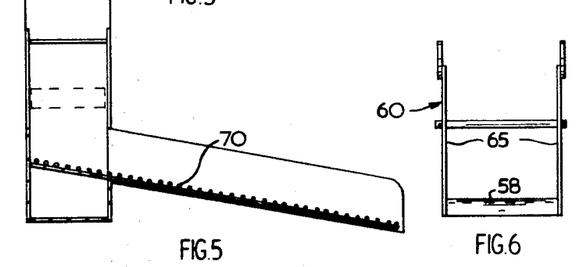
FIG. 5 is a transverse section view of the exit end portion of the apparatus taken along section line 5—5 of FIG. 1C and looking in the direction of the arrows.
FIGS. 6 and 7 are side and end elevation views respectively of a part of the means for adjusting the level of the liquid bath.
Figure 7:
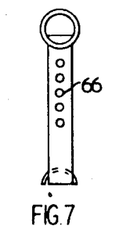

In order to provide exit chute 46 with the previously referred to means for preventing entry of air into chamber 10 while permitting the articles to exit from the latter, the further wall portion 53 has attached thereto at spaced points 53a and 53b the opposing ends of an elongated strip 56 of flexible material, the latter being of width sufficient to extend from sidewall to sidewall 52 of exit chute 46. The central portion of strip 56 passes over crossbar 58 of adjustment device 60 shown in FIG. 6, whereby strip 56 assumes a configuration something in the form of an inverted V as shown in FIG. 1C. This inverted V configuration effectively creates a dam which permits a bath of liquid 63, in this case water, to be retained in the lower portion of the exit chute 46. Since, in operation, additional liquid is constantly being added to the bath 63 from water inlet 45, there is a constant flow of water, indicated by arrows C, over the high-point A, such overflow being sufficient to carry the articles being handled over the high-point A as well, and into the exit assembly 62. Since low-point 51a of downwardly extending chute portion is below the upper level of bath 63, the latter acts as a liquid trap which prevents air from passing therethrough into chamber 10 while at the same time the above mentioned outflow of the articles being handled is permitted.

To adjust the level of point A and hence the level of bath 63, adjustment device 60 includes upwardly extending arms 65 attached to opposing ends of crossbar 58, such arms 65 each having a series of spaced apertures 66 therein. A rod 67 is passed through the desired set of apertures 66 to define the desired elevation for point A and the outwardly projecting ends of rod 67 are then engaged in opposing slots formed in the upper edges of spaced sidewalls 52.

The exit arrangement 62 includes an inclined grill 70 extending laterally outwardly from one side of the exit chute arrangement and positioned to receive the articles after they have passed over the high-point A. The articles roll down the inclined grill 70 and are removed therefrom by any suitable means. Water draining through the grill simply continues down trough 72 and is disposed of in any convenient fashion.

In addition to water inlet 45, further means may be provided directing a pressurized jet of water into the chute portion 48 below outlet opening 22, the jet of water being aligned in the direction of flow of water in chute portion 48 in order to assist in carrying the articles being handled over the high-point A of the liquid trap arrangement.

In operation, the air exhaust means 37 effects a pressure drop within chamber 10 which in turn causes a relatively high-velocity current of airflow through the intake conduit 35 and upwardly through intake chute 26 and thence in the interior of chamber 10. The pressure drop within chamber 10 also causes the liquid level within exit chute portion 48 to rise a small amount to balance the pressure drop within chamber 10. At the same time a stream of water is emitted from inlet 45 to effect a flow of water along floor 14 in the direction of arrows B. The free end of the intake conduit 35 may then be placed among fish and ice contained in the hold of a fishing trawler whereupon the high-velocity current of air flowing into and through the conduit 35 causes the fish and ice to be drawn into and through such conduit, through intake chute 26 and thence into the interior of chamber 10 whereupon the velocity of the air current is reduced by virtue of the sudden expansion thereof within chamber 10, thus allowing the fish and ice to pass into the flow of water on the floor 14 of chamber 10 at a shallow angle; they are then conveyed by the stream of water from inlet 45 along floor 14 towards the outlet opening 22 and along the inclined bottom wall 50 of exit chute arrangement 46 and into the bath of water 63, the fish striking the surface of such bath at an oblique angle or shallow angle. The fish and ice flow with the stream of water indicated by arrows C along the downwardly extending chute portion 48 and then are carried upwardly over the high-point A by the liquid current after which the fish are carried onto the exit grill arrangement 70 with the excess water and ice draining through the latter onto exit trough arrangement 72.

One specific embodiment of the invention has been described for purposes of illustration. Various modifications to this embodiment falling within the scope of the invention are possible. For example, the means of varying the level of the liquid bath could be replaced with a suitable rigid structure for maintaining the bath at one fixed level only. The configuration of the inlet and the exit of the chamber can be varied in design in order to suit the requirements of any particular installation and the point of connection of the chamber to the duct of the air-exhausting device can be shifted in location to other suitable parts of the chamber so long as provision is made for baffles, etc. to prevent entry of the moving fish into such air exhaust device. Other design modifications within the scope of the present invention are also possible and hence for a full understanding of the scope of the present invention reference must be had to the appended claims.

I claim:

1. A device for handling articles, particularly fish, comprising:
    a. an elongated enclosed chamber including a floor portion,
    b. an inlet passageway means associated with one end of said chamber and having a portion arranged to direct articles generally longitudinally of said chamber,
    c. an exit chute means connected to the opposite end of said chamber and adapted to contain a bath of liquid therein, said exit chute means being adapted to permit passage of articles through said liquid bath while preventing entry of air therethrough into said chamber,
    d. means for applying a subatmospheric pressure to the interior of the chamber to provide airflow through said inlet passageway means of velocity sufficient to carry said articles through the latter and into said chamber,
    e. and means for flowing a stream of liquid over the floor portion of said chamber and longitudinally of the latter whereby said articles enter the stream of liquid after passing through the inlet passageway means and prior to entering the liquid bath in the exit chute.

2. The device according to claim 1 wherein the inlet passageway means are arranged such that articles passing therethrough enter said chamber in relatively closely spaced relation to the floor of the latter with such article thereafter being gently decelerated by entering said stream of liquid passing over the floor portion of the chamber.

3. The device according to claim 1 wherein said means for flowing the stream of liquid is arranged to direct the latter over the floor portion of said chamber from its one end adjacent the inlet passageway means to the other end and outwardly through said exit chute means and into the liquid bath contained within the latter.

4. An article handling device according to claim 3 wherein said exit chute means is constructed such that articles passing thereinto meet the surface of the liquid bath contained therein at an acute angle.

5. A device according to claim 4 wherein said exit chute means includes means for adjusting the level of said liquid bath.

6. A device according to claim 1 wherein the floor portion of said chamber slopes downwardly from said one end of the chamber to said opposite end of the chamber at a shallow angle with respect to the horizontal.

7. A device according to claim 3 wherein the floor portion of said chamber slopes downwardly from said one end of the chamber to said opposite end of the chamber at a shallow angle with respect to the horizontal.

8. The device according to claim 1 wherein said elongated chamber is generally horizontally disposed.

9. A device for handling articles, particularly fish, comprising an elongated, generally horizontally disposed chamber including a floor portion; means defining an elongated inlet passageway having one end open to atmosphere and the opposite end connected to and leading into one end of said chamber and arranged to direct articles passing through the elongated inlet passageway lengthwise of said chamber from said one end towards the opposite end thereof, a suction device connected to apply a subatmospheric pressure to the interior of the chamber to cause air to rush through the inlet passageway means with sufficient velocity as to carry said articles therethrough and into said chamber, an exit chute means connected to the opposite end of said chamber and adapted to contain a bath of liquid therein, said exit chute means being adapted to permit passage of articles through said liquid bath while preventing entry of air therethrough from the atmosphere into said chamber, the elongated chamber being of a length sufficient as to permit any articles which are airborne at the time of entry into said chamber to settle by gravity substantially onto the floor of said chamber prior to entering the exit chute means, and means for providing a cushion of liquid over the floor portion of said chamber extending longitudinally of the latter whereby said articles enter the liquid cushion after passing through the inlet passageway means and prior to entering the liquid bath in the exit chute means.

10. A device for handling articles according to claim 9 wherein the means for providing said liquid cushion comprise means for flowing a stream of liquid longitudinally of said chamber over the floor portion thereof.

11. A device according to claim 9 wherein the floor portion of said chamber slopes downwardly from said one end of the chamber to said opposite end of the chamber at a shallow angle with respect to the horizontal.

12. A device for handling relatively delicate articles, particularly fish, comprising: an elongated, generally horizontally disposed enclosed chamber including a floor portion, an inlet passageway means adapted to extend to an article-receiving region such as the hold of a ship associated with one end of said chamber and in communication with the interior of the latter, said passageway means having a portion arranged to direct articles to pass through said passageway generally longitudinally of said chamber from said one end to the opposite end of said chamber, an exit chute means connected to said opposite end of said chamber and adapted to contain a bath of liquid therein, said exit chute means adapted to receive said articles which have passed longitudinally through said chamber and to permit passage of said articles through said liquid bath and outwardly of said exit chute means while preventing entry of air therethrough into said chamber, means for applying a subatmospheric pressure to the interior of the chamber to provide airflow through said inlet passageway means of velocity sufficient to carry said articles at a relatively high rate of speed through the latter and into said chamber, and means for flowing a stream of liquid over the floor portion of said chamber and longitudinally of the latter whereby said articles enter the stream of liquid after passing through the inlet passageway means and prior to entering the liquid bath in the exit chute, said liquid serving to cushion the floor of said chamber and assisting in preventing shock and damage to said articles.

13. The device according to claim 12 wherein the inlet passageway means are arranged such that articles passing therethrough enter said chamber in relatively close relation to the floor of the latter at a shallow angle relative thereto with such articles thereafter being gently decelerated by entering said stream of liquid passing over the floor portion of the chamber, said elongated chamber being of a length sufficient as to permit any articles which are airborne at the time of entry into said chamber to settle by gravity substantially onto the floor of said chamber prior to entering the exit chute means, said exit chute means being arranged such that all of the articles leaving from said chamber approach and enter the bath of liquid at an acute angle to the surface of the latter.

14. The device according to claim 13 wherein said means for flowing the stream of liquid is arranged to direct the latter over the floor portion of said chamber from its one end adjacent the inlet passageway means to the other end and outwardly through said exit chute means and into the liquid bath contained within the latter, with the flow of liquid thus created in said exit chute means assisting in carrying said articles through and outwardly of the latter.

15. An article handling device according to claim 12 wherein said exit chute means is constructed such that articles passing thereinto meet the surface of the liquid bath contained therein at an acute angle.

16. A device according to claim 13 wherein said exit chute means includes means for adjusting the level of said liquid bath.

17. A device according to claim 13 wherein the floor portion of said chamber slopes downwardly from said one end of the chamber to said opposite end of the chamber at a shallow angle with respect to the horizontal.

18. A device according to claim 14 wherein the floor portion of said chamber slopes downwardly from said one end of the chamber to said opposite end of the chamber at a shallow angle with respect to the horizontal.

UNITED STATES PATENT OFFICE
CERTIFICATE OF CORRECTION

Patent No. 3,614,167      Dated October 19, 1971

Inventor(s) William C. Patterson

It is certified that error appears in the above-identified patent and that said Letters Patent are hereby corrected as shown below:

Column 2, line 5, delete "724,152 filed Apr. 25, 1968 now Pat. No. 3,506,246" and insert --770,232 filed October 24, 1968--.

Column 2, line 6, after "Eisenhauer" and before "," insert --and now abandoned--.

Signed and sealed this 16th day of May 1972.

(SEAL)
Attest:

EDWARD M. FLETCHER, JR.
Attesting Officer

ROBERT GOTTSCHALK
Commissioner of Patents